United States Patent
Stautner et al.

(10) Patent No.: US 8,506,171 B2
(45) Date of Patent: Aug. 13, 2013

(54) STRUT BEARING

(75) Inventors: Ralf Stautner, Nuremberg (DE); Andreas Woellner, Nuremberg (DE); Gerhard Meyer, Lehrberg (DE); Alexander Zernickel, Herzogenaurach (DE); Rainer Lutz, Markt Erlbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 7 days.

(21) Appl. No.: 13/399,157

(22) Filed: Feb. 17, 2012

(65) Prior Publication Data
US 2012/0213464 A1 Aug. 23, 2012

Related U.S. Application Data

(60) Provisional application No. 61/444,188, filed on Feb. 18, 2011.

(51) Int. Cl.
*F16C 33/72* (2006.01)

(52) U.S. Cl.
USPC .......................................... 384/607

(58) Field of Classification Search
USPC .......................................... 384/607, 609, 420
See application file for complete search history.

(56) References Cited

U.S. PATENT DOCUMENTS

| | | | | |
|---|---|---|---|---|
| 4,239,301 A | * | 12/1980 | Pannwitz | 384/125 |
| 4,948,272 A | * | 8/1990 | Stowe | 384/607 |
| 7,422,200 B2 | * | 9/2008 | Kellam et al. | 384/424 |
| 7,993,061 B2 | * | 8/2011 | Watai et al. | 384/420 |

FOREIGN PATENT DOCUMENTS

DE 10 2006 057 559 A1 6/2008

* cited by examiner

*Primary Examiner* — Thomas R Hannon
(74) *Attorney, Agent, or Firm* — Lucas & Mercanti, LLP

(57) ABSTRACT

Spring strut bearing, which has an antifriction bearing that is arranged axially between an upper carrier part and a lower carrier part and a sealing ring. The upper carrier part has two upper rims, and the lower carrier part has two lower rims. The upper rims and the lower rims engage into one another with the result that a combined labyrinth and slip-ring seal is formed.

11 Claims, 2 Drawing Sheets

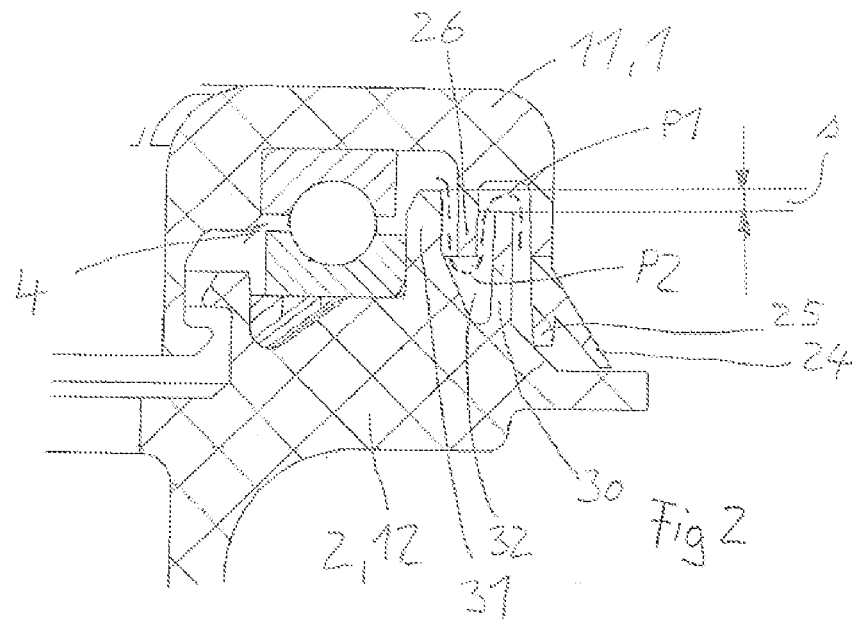
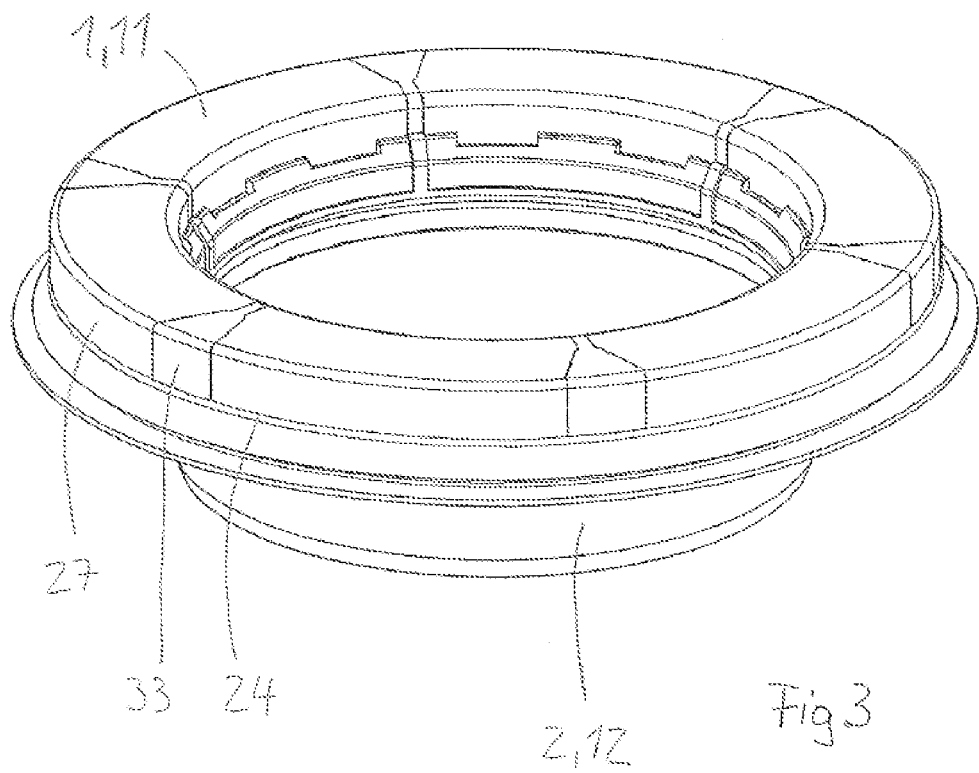

STRUT BEARING

CROSS-REFERENCE TO RELATED APPLICATIONS

This application claims priority of U.S. Provisional Patent Application No. 61/444,188 filed Feb. 18, 2011, which in turn claims the priority of DE 10 2011 004 334.9 filed Feb. 17, 2011. The priority of both applications is hereby claimed and both applications are incorporated by reference herein.

FIELD OF THE INVENTION

The present invention relates to a spring strut bearing which can be connected between spring strut and vehicle body to make it possible for the spring strut to rotate in the spring strut dome. The rotational movements of the spring strut occur, in particular, at the steered wheels of the front axle, in particular in the case of what are known as McPherson spring struts. A spring strut per se consists essentially of spring, shock absorber and axle stub.

BACKGROUND OF THE INVENTION

For example, DE 10 2006 057 559 A1 has disclosed a spring strut bearing, in which a ball bearing is provided, having bearing rings and having balls which are arranged between the antifriction bearing rings. The ball bearing is arranged axially between an upper carrier part and a lower carrier part. The upper carrier part is of multiple part construction. The upper carrier part forms a cap which engages around the spring strut bearing, and the lower carrier part forms a guide ring, on which a helical spring is guided. A sealing ring is formed integrally on the cap, the sealing lips of which sealing ring interact with a sealing face of the lower carrier part.

If undesirable foreign substances pass under the sealing lips, the latter can be damaged and impair the sealing function. Said foreign substances can pass into the region of the antifriction bearing and impair its function.

SUMMARY OF THE INVENTION

It is an object of the invention to specify a spring strut bearing where the seal of the spring strut bearing works reliably.

According to the invention, this object was achieved by a spring strut bearing which comprises an upper carrier part, a lower carrier part, an antifriction bearing, and a sealing ring. The antifriction bearing is arranged axially between the upper carrier part and the lower carrier part and has bearing rings and rolling bodies that are arranged between the bearing rings. The sealing ring is arranged on an outer circumference of the upper carrier part, and has at least one sealing lip that interacts with a sealing face of the lower carrier part. Advantages over the known spring strut bearing result from the fact that the upper carrier part has two upper rims, which are arranged coaxially with respect to one another and extend axially in the direction of the lower carrier part, the lower carrier part has two lower rims which are arranged coaxially with respect to one another and extend axially in the direction of the upper carrier part, and the upper rims and the lower rims engage into one another.

As a result of the rims engaging into one another, a double labyrinth seal is formed which is arranged behind the lip seal. If foreign substances pass the sealing lip into the interior of the spring strut bearing, said foreign substances are stopped in the labyrinth connected behind it and do not pass into the region of the antifriction bearing. Satisfactory rolling of the rolling bodies on the raceways of the antifriction bearing rings is ensured accordingly. The invention combines a slip-ring seal with a labyrinth seal in a complementary manner.

Engaging into one another in the context of the invention means that the rims overlap one another in the axial direction. That is to say along a longitudinal axis, it is possible in each case for radial play to be provided in the radial directions between rims engaging into one another of the upper carrier part and the lower carrier part.

A rim in the context of the invention can be formed if a section of one carrier part axially overlaps a section of the other carrier part. The extent of the rim in the radial directions can be adapted to the construction. For example, the lower rim of the lower carrier part, which lies radially on the inside, can have an elongate wall in the axial direction on its side which faces the rim which lies on the outside and the elongate wall can be arranged in an inclined manlier with respect to the longitudinal axis, and on the side which faces the antifriction bearing, the rim can be configured as an annularly closed shoulder, in order to receive and to center an antifriction bearing ring.

The rims which are configured according to the invention are arranged radially outside the antifriction bearing in such a way that the rims which are in engagement with one another are arranged between the antifriction bearing and undesirable foreign substances which might enter the spring strut bearing from outside.

One development provides that that lower rim of the lower carrier part, which lies radially on the outside, engages into an upper annular groove, which is formed by the two upper rims of the upper carrier part. With the two upper rims, said lower rim delimits a first deflection part within the labyrinth.

One development provides that that upper rim of the upper carrier part, which lies radially on the inside, engages into a lower annular groove, which is formed by the two lower rims of the lower carrier part. With the two lower rims, said upper rim delimits a second deflection part within the labyrinth.

Foreign substances can be prevented from passing into the region of the antifriction bearing by the labyrinths which are configured according to the invention.

One development provides that the lower rim, which lies radially on the inside, projects with its free end axially beyond the free end of the lower rim which lies radially on the outside. In this way, a geodetic difference is formed from radially on the inside to radially on the outside. This means that foreign substances, should they have passed the first deflection part of the labyrinth, are prevented by the geodetic height difference from also passing the second deflection part. A comparable effect can be achieved if, according to one development, the upper rim which lies radially on the outside projects with its free end axially beyond the free end of the upper rim which lies radially on the inside, and axially overlaps the lower rim which lies radially on the outside. In this case, there is likewise a geodetic difference from radially on the inside to radially on the outside, the overlapping region between the upper rim which lies radially on the outside and the lower rim which lies radially on the outside, in particular, already preventing a penetration of foreign substances into the first deflection section of the labyrinth.

One development provides that that upper rim of the upper carrier part, which lies radially on the outside, forms the sealing ring. The free end of said rim can be provided with the integrally formed sealing ring which preferably has two circumferential sealing lips, the outer sealing lip forming a gap seal or a rubbing seal with the sealing face of the lower carrier part, and the inner sealing lip forming a rubbing seal or a gap seal with the sealing face of the lower carrier part. The lower carrier part can have a radial projection, the face of which, which is arranged approximately transversely with respect to the longitudinal axis, forms the sealing face, a conical face which adjoins said projection radially inwardly being configured as sealing face for the inner sealing lip. The conical face tapers toward the lower end of the spring strut. The conical configuration of the sealing face can compensate for axial and radial deformations of the inner sealing lip and/or deformations of the upper rim which lies radially on the outside, by the inner sealing lip bearing with elastic deflection against the conical sealing face.

One development provides that the upper carrier part and the sealing ring are produced from plastic using the two-component injection process, the carrier part being produced from a harder plastic and at least the inner sealing lip of the sealing ring being produced from a softer plastic. The sealing lips can both be produced from the softer plastic.

BRIEF DESCRIPTION OF THE DRAWING

In the following text, the invention will be explained in greater detail using an exemplary embodiment which is depicted in two figures, in which:

FIG. 2 shows a further longitudinal section through the spring strut bearing according to the invention, and FIG. 3 shows the spring strut bearing from FIG. 1 in a perspective illustration.

DETAILED DESCRIPTION OF THE INVENTION

Figure 1:
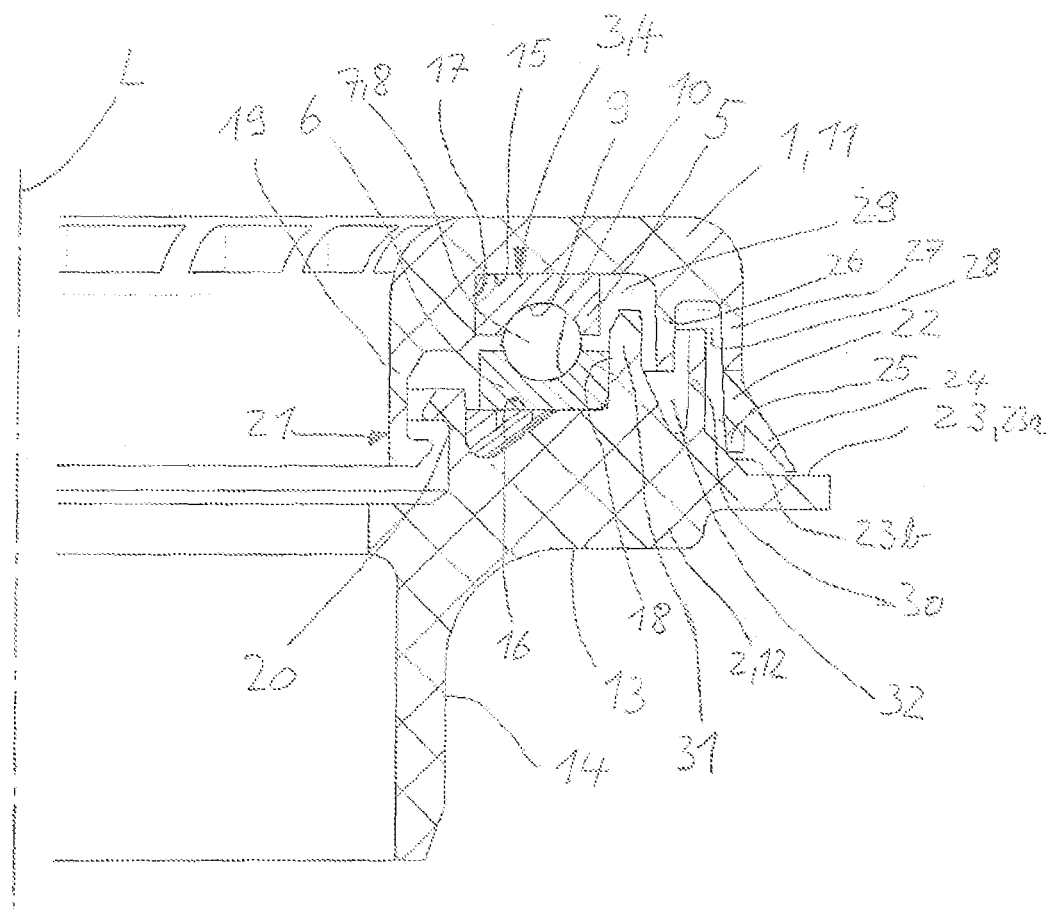
FIG. 1 shows details of a longitudinal section through a spring strut bearing according to the invention.

FIG. 1 shows details of a longitudinal section through a spring strut bearing according to the invention. An antifriction bearing 4, which is configured as an axial groove ball bearing 3, is arranged between an upper carrier part 1 and a lower carrier part 2. Instead of the axial groove ball bearing 3, an axial angular contact ball bearing with a single-sided action can be provided.

The axial ball bearing 3 has two bearing rings 5, 6, and rolling bodies 8, which are configured as balls 7, rolling on raceways 9, 10, which face one another, of the two bearing rings 5, 6 of the axial ball bearing 3.

The upper carrier part 1 is configured as a cap 11. The lower carrier part 2 is configured as a guide ring 12. The cap 11 engages around the guide ring 12 radially on the inside and radially on the outside, axially in the direction of the longitudinal axis L of the spring strut bearing.

The guide ring 12 is provided with a shoulder 13 for supporting a helical spring (not shown here). The shoulder 13 adjoins a cylindrical guide projection 14 for guiding the helical spring.

The cap 11 and the guide ring 12 are produced in each case from plastic using the injection process. On their end sides which face one another, the cap 11 and the guide ring 12 are provided in each case with a supporting face 15, 16 for the bearing rings 5, 6, which supporting face 15, 16 is arranged transversely with respect to the longitudinal axis L. The supporting faces 15, 16 are adjoined by centering faces 17, 18 for the bearing rings 5, 6, which centering faces 17, 18 are arranged coaxially with respect to the longitudinal axis.

On its inner circumference, the cap 11 has an integrally formed circumferential rim 19 which projects axially in the direction of the guide ring 12 and axially covers a circumferential rim 20 which is formed integrally on the inner circumference of the guide ring 12. The rim 19 and the rim 20 are part of a snap-action connection 21, by means of which the cap 11 and the guide ring 12 are connected captively to one another.

The upper carrier part 1, and therefore the cap 11, is provided on its outer circumference with an integrally formed sealing ring 22 which interacts with a sealing face 23 which is formed on the lower carrier part 2 and therefore on the guide ring 12. The sealing face 23 comprises a planar sealing section 23a which is arranged transversely with respect to the longitudinal axis L and a conical sealing section 23b which is arranged coaxially with respect to the longitudinal axis L. The sealing ring 22 has two coaxially arranged, circumferential sealing lips 24, 25. Together with the planar sealing section 23a of the sealing face 23, the outer sealing lip 24 forms a gap seal. Together with the conical sealing section 23b of the sealing face 23, the inner sealing lip 25 forms a rubbing seal. The inner sealing lip 25 bears with spring-elastic prestress against the conical sealing section. In this arrangement, a satisfactory rubbing contact is ensured even in the case of an unfavorable tolerance position or in the case of a deformation of the inner sealing lip or in the case of a deformation of the cap 11.

The upper carrier part 1, therefore the cap 11 in the exemplary embodiment, and the lower carrier part 2, and therefore the guide ring 12, are provided radially outside the antifriction bearing 4 in each case with rims which engage into one another in such a way that a double labyrinth seal is formed.

In the following text, the double labyrinth seal will be explained in greater detail, reference being made to the cap 11 and the guide ring 12; these comments likewise apply to the carrier parts 1 and 2 which can be configured without the described snap-action connection and/or the guide function for a helical spring.

The cap 11 is provided on its outer circumference with the two annularly closed rims 26, 27 which are arranged coaxially with respect to the longitudinal axis L and delimit a circumferential annular groove 28. The two rims 26, 27 which are molded integrally onto the cap 11 extend with their free ends in the direction of the guide ring 12. An annular recess 29 which is arranged coaxially with respect to the longitudinal axis L and is delimited on one side by the antifriction bearing 4 and on the other side by the rim 26 is formed between the rim 26 and the antifriction bearing 4.

On its outer circumference, the guide ring 12 is provided with two annularly closed rims 30, 31 which are arranged coaxially with respect to the longitudinal axis L and delimit a circumferential annular groove 32. The two rims 30, 31 which are molded integrally onto the guide ring 12 extend with their free ends in the direction of the cap 11.

The rims 26 and 27 are arranged in a radially offset manner with respect to the rims 30, 31. The rim 30 of the guide ring 12 engages into the annular groove 28. The rims 26, 27 overlap the rim 30 in the axial direction. The rim 26 of the cap 11 engages into the annular groove 32. The rims 30, 31 overlap the rim 26 in the axial direction.

It can be gathered from FIG. 2 that a geodetic difference is formed between the free ends of the two rims 30, 31 of the guide ring 12, which difference is shown in the figure by the height difference "s." The direction of the difference runs, falling away, from radially on the inside to radially on the outside. The height difference "s" is dimensioned in such a way that, when the spring strut is installed in the vehicle, there is a sufficient geodetic difference, in order to avoid undesirable foreign substances passing into the region of the antifriction bearing 4. FIG. 2 shows a deflection path of the double labyrinth in a dashed manner. The deflection path has a first deflection part P1 which is delimited by the free end of the rim 30. The deflection path has a second deflection part P2 which is delimited by the free end of the rim 26.

A geodetic difference falling from radially on the inside to radially on the outside is likewise formed between the vertex of the first deflection part P1 and the contact of the inner sealing lip 25 with the conical sealing face 23b.

The lower annular groove 32 can be filled with grease, with the result that the antifriction bearing can be closed to the outside in the direction of the path of the double labyrinth in relation to the penetration of undesirable liquid, gaseous or solid substances.

If undesirable foreign substances pass the sealing lips 24, 25 between the rim 27 of the cap 11 and the rim 30 of the guide ring 12 from radially on the outside, further penetration in the direction of the antifriction bearing 4 is prevented satisfactorily by way of the double labyrinth and the geodetic differences described.

FIG. 3 shows the spring strut bearing according to the invention in a perspective illustration. The cap 11 with the integrally formed rim 27 and the guide ring 12 can be seen clearly. Furthermore, the sealing lip 24 of the sealing ring 22 can be seen.

The sealing ring 22 is connected integrally to the cap 11. The cap 11 is produced from thermoplastic using the two-component injection process. In the exemplary embodiment, a polyamide PA66 is used for the cap per se. The designation polyamides is usually used as a designation for synthetic, commercially usable thermoplastics.

A thermoplastic elastomer (linear elastomers; abbreviation TPE) is preferably used for the sealing ring 22. At room temperature, these plastics behave comparably to the classic elastomers, but can be deformed plastically with the supply of heat and therefore exhibit thermoplastic behavior. On account of the very short cycle times in production as a result of the manufacturing process which is similar to that of plastic, thermoplastic elastomers are being used increasingly, for example, in body seals of automobiles.

Injection points (not shown) for the soft TPE are provided at a plurality of locations distributed over the circumference. In the drawing, six segments 33 are indicated which are arranged on the surface of the cap 11 and are formed from the TPE. During the injection operation, the TPE flows along the rim 27 and finally forms the sealing ring 22 with the soft sealing lips 24, 25. In an alternative spring strut bearing according to the invention, merely the inner sealing lip can be injection molded from the soft TPE, whereas the outer sealing lip is injection molded from the hard polyamide.

LIST OF DESIGNATIONS

1. Upper Carrier Part
2. Lower Carrier Part
3. Axial Ball Bearing
4. Antifriction Bearing
5. Bearing Ring
6. Bearing Ring
7. Ball
8. Rolling Bodies
9. Raceway
10. Raceway
11. Cap
12. Guide Ring
13. Shoulder
14. Guide Projection
15. Supporting Face
16. Supporting Face
17. Centering Face
18. Centering Face
19. Rim
20. Rim
21. Snap-Action Connection
22. Sealing Ring
23. Sealing Face
24. Sealing Lip
25. Sealing Lip
26. Rim
27. Rim
28. Annular Groove
29. Annular Recess
30. Rim
31. Rim
32. Annular Groove
33. Segment
P1 First Deflection Part
P2 Second Deflection Part

The invention claimed is:

1. A spring strut bearing, comprising:
   an upper carrier part having two coaxial upper rims;
   a lower carrier part having two coaxial lower rims, the upper rims extend axially in a direction of the lower carrier part and the lower rims extend axially in a direction of the upper carrier part with the upper rims and the lower rims engaging into one another;
   an antifriction bearing, which is arranged axially between the upper carrier part and the lower carrier part, having bearing rings and rolling bodies that are arranged between the bearing rings; and
   a sealing ring, which is arranged on an outer circumference of the upper carrier part, having at least one sealing lip that interacts with a sealing face of the lower carrier part.

2. The spring strut bearing according to claim 1, wherein the two upper rims of the upper carrier part form an upper annular groove, and a radially outer of the lower rims of the lower carrier part engages into the upper annular groove.

3. The spring strut bearing according to claim 2, wherein a radially inner of the lower rims projects axially beyond the radially outer lower rim.

4. The spring strut bearing according to claim 2, wherein a radially outer of the upper rims projects axially beyond a radially inner of the upper rims and axially overlaps the radially outer lower rim.

5. The spring strut bearing according to claim 1, wherein the two lower rims of the lower carrier part form a lower annular groove, and a radially inner of the upper rims of the upper carrier part engages into the lower annular groove.

6. The spring strut bearing according to claim 1, wherein a radially outer of the upper rims of the upper carrier part forms the sealing ring.

7. The spring strut bearing according to claim 1, wherein the upper carrier part and the sealing ring are connected integrally to one another, and the sealing ring has two coaxially arranged sealing lips, including a radially outer sealing lip and a radially inner sealing lip.

8. The spring strut bearing according to claim 7, wherein the radially outer sealing lip forms a gap seal with the sealing face of the lower carrier part, and the radially inner sealing lip forms a rubbing seal with the sealing face of the lower carrier part.

9. The spring strut bearing according to claim 8, wherein the upper carrier part and the sealing ring are made of plastic using a two-component injection process, the upper carrier part being made of a harder plastic than the radially inner sealing lip of the sealing ring.

10. The spring strut bearing according to claim 9, wherein both of the sealing lips are made of a plastic that is softer than the plastic of the upper carrier part.

11. The spring strut bearing according to claim 1, wherein the lower carrier part is a guide ring that has a shoulder for supporting a helical spring and a guide projection for guiding the helical spring, and the upper carrier part is a cap configured to be supported on a chassis-side bearing point engaging around the guide ring in an axial direction.

\* \* \* \* \*